US009178774B2

(12) United States Patent
Zalewski

(10) Patent No.: US 9,178,774 B2
(45) Date of Patent: *Nov. 3, 2015

(54) CHANNEL HOPPING SCHEME FOR UPDATE OF DATA FOR MULTIPLE SERVICES ACROSS MULTIPLE CHANNELS

(71) Applicant: Sony Computer Entertainment America LLC, San Mateo, CA (US)

(72) Inventor: Gary M. Zalewski, Oakland, CA (US)

(73) Assignee: Sony Computer Entertainment America, LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,228

(22) Filed: Dec. 9, 2013

(65) Prior Publication Data

US 2014/0092917 A1    Apr. 3, 2014

Related U.S. Application Data

(60) Continuation of application No. 12/948,664, filed on Nov. 17, 2010, now Pat. No. 8,605,725, which is a division of application No. 12/122,622, filed on May 16, 2008, now Pat. No. 8,359,614.

(51) Int. Cl.
*H04L 12/56*    (2006.01)
*G06F 15/16*    (2006.01)
(Continued)

(52) U.S. Cl.
CPC .............. *H04L 41/50* (2013.01); *H04H 20/106* (2013.01); *H04H 40/09* (2013.01); *H04H 60/25* (2013.01); *H04N 5/4401* (2013.01); *H04N 5/50* (2013.01); *H04N 7/17318* (2013.01); *H04N 21/235* (2013.01); *H04N 21/435* (2013.01); *H04N 21/4345* (2013.01); *H04N 21/4348* (2013.01); *H04N 21/44209* (2013.01); (Continued)

(58) Field of Classification Search
USPC ........ 370/392, 458, 466; 455/426.1; 709/223, 709/231
See application file for complete search history.

(56) References Cited

U.S. PATENT DOCUMENTS 5,257,416 A    10/1993    Cannon
6,292,834 B1    9/2001    Ravi et al.
(Continued)

FOREIGN PATENT DOCUMENTS

CN    1612596    4/2005
JP    2005-277855    10/2005
(Continued)

OTHER PUBLICATIONS

Japanese Office Action JP Application No. 2011-509517, dated Jun. 17, 2014.
(Continued)

*Primary Examiner* — Kiet G Tang
(74) *Attorney, Agent, or Firm* — Joshua D. Isenberg; JDI Patent

(57) ABSTRACT

Data transmitted over different channels may be updated by receiving one or more input data streams containing data for one or more digital data services, wherein the data is in the form of a plurality of packets, wherein each packet includes information identifying a channel and a number of related downstream packets; determining from the plurality of packets a time that an update packet containing data for one of the digital data services will be transmitted as part of the signal; and generating a schedule packet containing the time that the update packet will be transmitted as part of a signal.

14 Claims, 6 Drawing Sheets

(51) Int. Cl.
| | |
|---|---|
| H04W 4/00 | (2009.01) |
| H04L 12/24 | (2006.01) |
| H04H 20/10 | (2008.01) |
| H04H 40/09 | (2008.01) |
| H04H 60/25 | (2008.01) |
| H04N 5/44 | (2011.01) |
| H04N 5/50 | (2006.01) |
| H04N 7/173 | (2011.01) |
| H04N 21/235 | (2011.01) |
| H04N 21/434 | (2011.01) |
| H04N 21/435 | (2011.01) |
| H04N 21/442 | (2011.01) |
| H04N 21/45 | (2011.01) |
| H04N 21/458 | (2011.01) |
| H04N 21/6375 | (2011.01) |
| H04N 21/6377 | (2011.01) |
| H04N 21/658 | (2011.01) |
| H04H 60/72 | (2008.01) |

(52) U.S. Cl.
CPC ...... *H04N 21/4524* (2013.01); *H04N 21/4586* (2013.01); *H04N 21/6375* (2013.01); *H04N 21/6377* (2013.01); *H04N 21/658* (2013.01); *H04H 60/72* (2013.01); *H04H 2201/60* (2013.01)

(56) References Cited

U.S. PATENT DOCUMENTS

| | | | |
|---|---|---|---|
| 6,337,719 | B1 | 1/2002 | Cuccia |
| 6,463,585 | B1 | 10/2002 | Hendricks et al. |
| 6,804,824 | B1 | 10/2004 | Potrebic et al. |
| 6,988,144 | B1 * | 1/2006 | Luken et al. ............ 709/231 |
| 7,140,032 | B2 | 11/2006 | Dew et al. |
| 7,774,815 | B1 | 8/2010 | Allen |
| 8,359,614 | B2 | 1/2013 | Zalewski |
| 8,605,725 | B2 | 12/2013 | Zalewski |
| 2003/0219081 | A1 | 11/2003 | Sheehan |
| 2004/0037317 | A1 * | 2/2004 | Zalitzky et al. ............ 370/466 |
| 2006/0268913 | A1 | 11/2006 | Singh et al. |
| 2007/0264998 | A1 * | 11/2007 | Wong et al. ............ 455/426.1 |
| 2007/0288972 | A1 | 12/2007 | Lee et al. |
| 2011/0004678 | A1 * | 1/2011 | Rothrock ............ 709/223 |

FOREIGN PATENT DOCUMENTS

| | | |
|---|---|---|
| KR | 19950703826 | 9/1995 |
| KR | 20070074915 | 7/2007 |
| KR | 20080031557 | 4/2008 |
| WO | 0205560 A2 | 1/2002 |

OTHER PUBLICATIONS

Extended European search report dated Aug. 18, 2011 for European Patent Application No. 09747079.3.
Office Action dated Dec. 15, 2010 for U.S. Appl. No. 12/122,622 14 pages.
Korean Notice of Preliminary Rejection from KIPO issued date Mar. 16, 2012 for Korean Patent Application No. 2010-7028343.
Australian Examiner First Report dated Sep. 24, 2012 for Australian Patent Application No. 2009246744.
Notice of Allowance and Fee(s) due issued date Oct. 11, 2012 for U.S. Appl. No. 12/122,622, entitled"Channel Hopping Scheme for Update of Data for Multiple Services Across Multiple Digital Broadcast Channels".
European Patent Office examination report issued date Aug. 10, 2012 for European Patent Application No. 09747079.3.
Australian Examiner Second Report dated Dec. 18, 2012 for Australian Patent Application No. 2009246744.
Japan Patent Office Notification of Reasons for Refusal of Feb. 5, 2013 in Japanese Patent Application No. 2011-509517.
Summons to Oral Proceedings dated Feb. 12, 2013 for European Patent Application No. 09747079.3.
Office Action dated Aug. 31, 2012 in Chinese Patent Application No. 200980128266.1.
Office Action dated Apr. 15, 2013 in Chinese Patent Application No. 200980128266.1.
Japan Patent Office Notification of Reasons for Refusal of Dec. 10, 2013 in Japanese Patent Application No. 2011-509517.
Office Action dated Dec. 13, 2012 for U.S. Appl. No. 12/948,664 11 pages.

* cited by examiner

CHANNEL HOPPING SCHEME FOR UPDATE OF DATA FOR MULTIPLE SERVICES ACROSS MULTIPLE CHANNELS

CLAIM OF PRIORITY

This application is continuation of U.S. patent application Ser. No. 12/948,664 filed Nov. 17, 2010, the entire contents of which are incorporated herein by reference. U.S. patent application Ser. No. 12/948,664 is a divisional application of and claims the priority benefit of U.S. patent application Ser. No. 12/122,622 to Gary M. Zalewski, filed May 16, 2008 and entitled "CHANNEL HOPPING SCHEME FOR UPDATE OF DATA FOR MULTIPLE SERVICES ACROSS MULTIPLE DIGITAL BROADCAST CHANNELS", the entire contents of which are incorporated herein by reference.

FIELD OF THE INVENTION

Embodiments of this invention are related to digital broadcasting and more specifically to updating data for services usable in conjunction with a digital broadcast signal.

BACKGROUND OF THE INVENTION

Introduced in the late 1990s, digital television (DTV) technology appealed to the television broadcasting business and consumer electronics industries as offering new consumer services and business opportunities that were impractical with previous analog television. Digital television is more flexible and efficient than analog television. When properly used by broadcasters, digital television allows higher-quality images and sound and more programming choices than analog does. In DTV moving images and sound are sent and received by means of discrete (digital) signals, in contrast to the analog signals used by analog television. Digital television includes, but is not limited to Digital Terrestrial Television (DTTV or DTT), which is an implementation of digital technology to provide a greater number of channels and/or better quality of picture and sound using aerial broadcasts to a conventional antenna (or aerial) as opposed to a satellite dish or cable connection.

The development of digital television has lead to many changes in television broadcasting and related industries. Many countries have mandated a change from an analog television signal format to a new digital format. One example of such a digital television broadcast standard was developed by the Advanced Television Systems Committee. With a conventional analog television broadcast, a video signal modulates a carrier wave signal that is broadcast by a transmission tower. A television set contains a receiver that detects broadcast signals. The receiver includes a tuner that selects a particular channel according to its carrier frequency and a demodulator that extracts the video signal from the modulated carrier signal. With a digital television signal, the video signal is generated in a digital format or an analog video signal is converted to a digital format to produce a digital signal. The carrier wave is modulated according to the digital signal format, e.g., using vestigial sideband (VSB) modulation. This new format allows data for additional digital services to be broadcast along with a regular television signal. Examples of such services may include real time stock quotes, sports, weather and traffic updates and other services traditionally associated with delivery via two-way media, such as the internet, digital wireless services or cellular telephone services.

The delivery of digital services by a primarily one-way medium through digital broadcast presents certain challenges and problems. Conventionally, a broadcast, digital or otherwise sends information on a schedule determined by the broadcaster. Digital services delivered by two-way media, by contrast, may be obtained more or less on demand. Updating information delivered by digital broadcast over multiple broadcast channels presents certain problems heretofore unrecognized in the art.

It is within this context that embodiments of the present invention arise.

SUMMARY OF THE INVENTION

According to an embodiment of the present invention, a method for updating data broadcast over different channels may be implemented in a digital broadcast receiving device configured to receive programming and data over a plurality of broadcast channels. A first digital broadcast signal may be received over a first digital broadcast channel. The receiving device may be tuned to a second digital broadcast channel at a predetermined time and a second digital broadcast signal may be received over the second digital broadcast channel. The second digital broadcast signal includes data associated with one or more services resident on the receiving device. Selected data associated with one or more of the services may be extracted from the second digital broadcast signal and the data may be stored or utilized with the receiving device.

In some embodiments the first digital broadcast signal may include television programming mixed with overlaid data. The overlaid data may be data associated with the first digital broadcast channel or another digital broadcast channel.

In some embodiments, receiving the first digital broadcast signal may include storing information derived from the first digital broadcast signal in a buffer. Images derived from the information stored in the buffer may be displayed while the second digital broadcast signal is received.

In some embodiments the receiving device may include a tuner. The first digital broadcast signal may be received by tuning the tuner to the first broadcast channel and the tuner may be tuned to the second digital broadcast channel at the predetermined time.

In some embodiments, missing data that was not received as part of an update may be identified and retrieved.

In some embodiments, a geographic location of the receiving device may be determined. In such embodiments, tuning the receiver to the second digital broadcast channel at the predetermined time and receiving the second digital broadcast signal may include selecting the second digital broadcast channel based on the geographic location of the receiving device. The selected data may be extracted from the second digital broadcast signal based on the geographic location.

In accordance certain embodiments, the second digital broadcast channel may be selected based on a schedule of update priority for the one or more services resident on the receiving device.

In some embodiments the predetermined time may be determined from data embedded in the first digital broadcast signal. For example, the data embedded in the first digital broadcast signal may indicate a time of a relevant data gap in the first digital broadcast signal.

In some embodiments the receiving device may include a first tuner and a second tuner. In such a case, the first tuner may be tuned to the first digital broadcast channel and the second tuner may be selectively tuned to the second digital broadcast channel at the predetermined time. The second digital broadcast signal may be received with the first tuner and the first digital broadcast signal may be received with the first tuner.

According to another embodiment of the invention, a digital broadcast receiving device may include a receiver unit configured to receive programming and data over a plurality of broadcast channels, a processor coupled to the receiver unit; a memory coupled to the processor; and a set of processor readable instructions embodied in the memory for execution on the processor. The instructions may be configured to implement a method for updating data broadcast over different channels including a) receiving a first digital broadcast signal over a first digital broadcast channel; b) receiving a second digital broadcast signal over the second digital broadcast channel with the receiver at a predetermined time, wherein the second digital broadcast signal includes data associated with one or more services resident on the receiving device; c) extracting data associated with one or more of the services; and d) storing the data in the memory or utilizing the data in program executed on the processor.

In some embodiments the receiver may include a single tuner. In other embodiments, the receiver may include first and second tuners.

In some embodiments, the device may further comprise a geographical positioning system coupled to the processor.

According to another embodiment, an update schedule may be generated for data transmitted with a digital broadcast signal. One or more input data streams may be received. The input data streams contain data for one or more digital broadcast data services. The data may be in the form of a plurality of packets. Each packet may have a header and a payload. A time that an update packet containing data for one of the digital broadcast data services will be broadcast as part of a digital broadcast signal may be determined from the headers. A schedule packet may be generated containing the time that the update packet will be broadcast as part of the digital broadcast signal. The schedule packet may be broadcast before broadcasting the update packet.

In some versions of this embodiment, the header may include information identifying a channel over which the packet associated with the header is to be broadcast.

In some versions of this embodiment, the header may include information identifying a type of data in the payload.

In some versions of this embodiment, the header may include information identifying a size of the packet.

In some versions of this embodiment, the header may include information identifying a given packet as being associated with other packets in the digital broadcast signal.

In some versions of this embodiment, the header may include information identifying a number of related downstream packets.

In some versions of this embodiment, the schedule packet may include update times for update packets that are to be transmitted over different digital broadcast channels.

In some versions of this embodiment, the schedule packet may include information relating to a broadcast time for one or more other schedule packets.

In some versions of this embodiment, the schedule packet may include information relating to a duty cycle with which schedule packets are broadcast.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Introduction

A digital television broadcast may be implemented in conjunction with multiple services that utilize data broadcast on the same frequency or channel as a conventional television broadcast. A broadcaster, such as a television station or television network, may bundle these services with its regular broadcast services. However, users of devices that receive the digital broadcast signal may wish to receive digital services provided by different broadcasters. For example a user may receive sports and weather updates from one broadcaster and stock updates from another broadcaster. If each broadcaster transmits over a different channel, the user must switch channels to receive updates for all three services. Consequently, in a digital broadcast environment, there is a previously unrecognized need for a way to automatically tune the user's device to different channels to receive updates for information associated with services on a user's device. Fulfilling such a need would allow a single device to update assets and objects that are broadcast on different channels.

Figure 1:
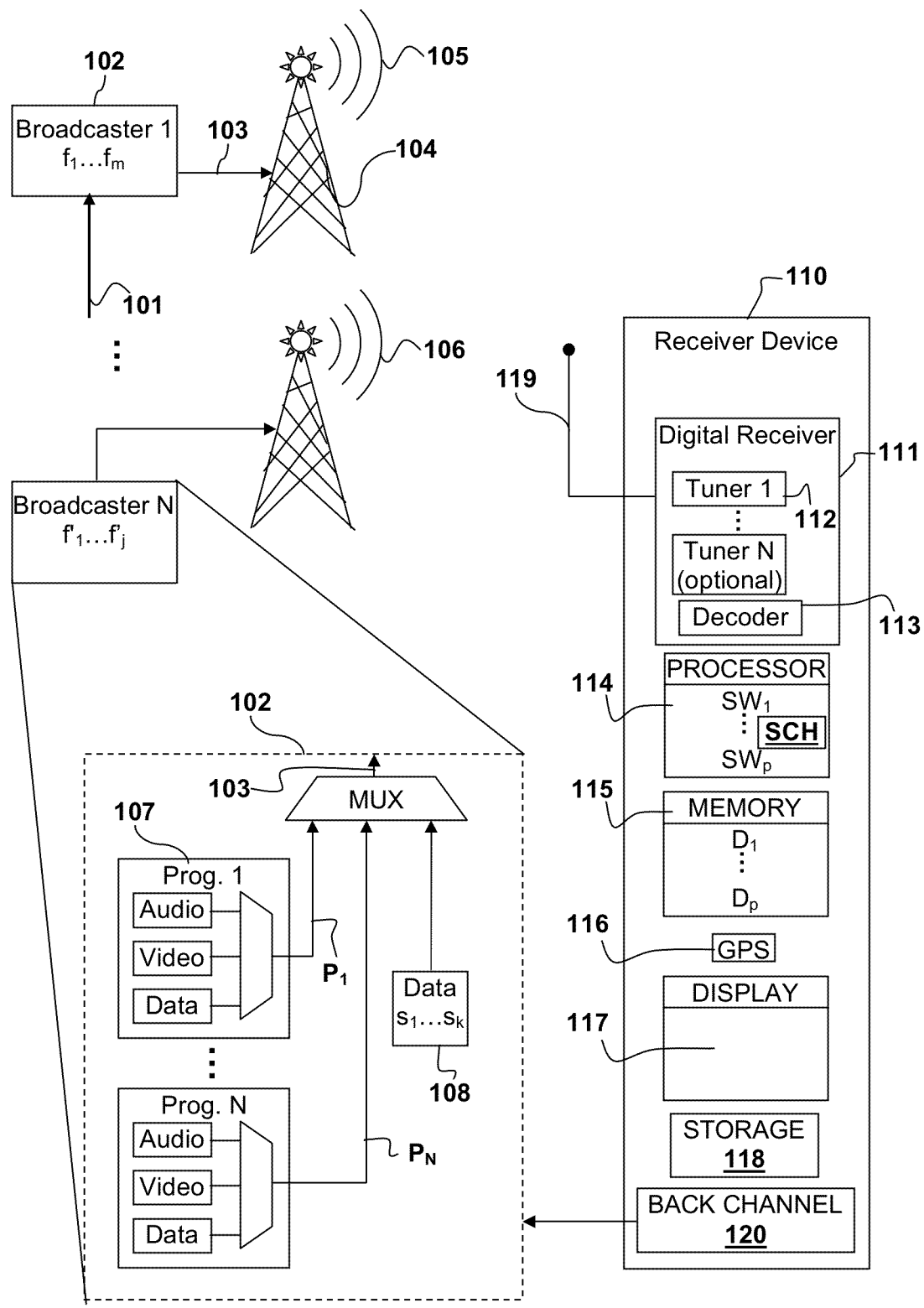
FIG. 1 is a schematic diagram illustrating a broadcast environment in which embodiments of the present invention may be employed.

FIG. 1 schematically illustrates a broadcast environment in which embodiments of the present invention may be employed. In such an environment broadcasters 102 receive or generate input data streams 101. The input data streams 101 are converted to digital broadcast data streams 103, which are converted to a digital broadcast signal 105 for reception by digital broadcast receivers 110. By way of example, a digital broadcast signal 105 may be a modulated radiation signal transmitted from a broadcast tower 104, e.g., in the form of an over-the-air broadcast, such as by radiofrequency electromagnetic wave signal. It is noted that the digital broadcast signal 105 transmitted by a given broadcast tower 104 may include multiple digital broadcast channels modulated at different carrier signal frequencies. Broadcast towers 104 associated with different broadcast units 102 may broadcast over different sets of frequencies. For example Broadcaster 1 may broadcast over a first set of carrier frequencies $f_1 \ldots f_m$ and Broadcaster N may broadcast over a different set of carrier frequencies $f'_1 \ldots f'_j$. There may be some overlap between the two sets of carrier frequencies.

Furthermore, the digital broadcast signal 105 may be transmitted in a form other than an over-the-air broadcast. Alternatively, embodiments of the invention may be used in conjunction with digital broadcasts transmitted over media such as cable (e.g., coaxial cable), optical fiber, or satellite transmission.

By way of example, the digital broadcast signal 105 may be configured in accordance with a digital broadcast standard. Examples of digital broadcast standards include, but are not limited to, the Digital Video Broadcasting (DVB) family of standards maintained in Europe and Australia, the Advanced Television Standards Committee (ATSC) family of standards developed for use in the United States and Canada, the Integrated Services Digital Broadcasting (ISDB) family of standards developed for use in Japan, Digital Multimedia Broadcasting (DMB) standard used in South Korea.

The DVB family of standards includes the DVB-S and DVB-S2 standards for satellite television, the DVB-T and DVB-T2 standards for terrestrial television, DVC-C for cable television and DVB-H for mobile television and other DVB standards which have been or may be developed. The ATSC family of standards includes the ATSC standard for terrestrial television broadcasts and the ATSC M/H standard for broadcasts to mobile and handheld devices. The ISDB family of standards includes the IDSB-S, ISDB-T, and ISDB-C standards, which were developed for satellite, terrestrial and cable television respectively.

By way of example, and not by way of limitation, the digital broadcast signal 105 may be configured according to the ATSC or ATSC-M/H standards. The ATSC standard is described in detail, e.g., in "ATSC Digital Television Standard Part 1—Digital Television System" (A/53, Part 1:2007), "ATSC Digital Television Standard Part 2—RF/Transmission System Characteristics" (A/53, Part 2:2007), and "ATSC Digital Television Standard Part 3—Service Multiplex and Transport Subsystem Characteristics" (A/53, Part 3, 2007), the disclosures of all three of which are incorporated herein by reference. The ATSC Data Broadcast Standard is described, e.g., in (ATSC Recommended Practice: Implementation Guidelines for the ATSC Data Broadcast Standard (Doc. A/90)", which is incorporated herein by reference.

The input data stream 101 may include data streams from multiple sources. For example, within the broadcaster 102 data streams for different television program 107 may be made up of audio, video and ancillary data streams. These data streams may be multiplexed to form a program data stream associated with a given program 107. Multiple program data streams may be multiplexed with each other into the broadcast data stream 103. Furthermore, data service data streams 108 for broadcast data services $s_1 \ldots s_k$ not specifically associated with a given program 107 may be overlaid (e.g., multiplexed) with the program data streams $P_1 \ldots P_N$ into the broadcast data stream 103.

The data streams 101 that make up digital broadcast data stream 103 may be subject to data transforms, such as source coding and compression. As used herein, "source coding and compression" refers to bit rate reduction methods, also known as data compression, appropriate for application to the video, audio, and ancillary digital data streams. The term "ancillary data" includes control data, conditional access control data, and data associated with the program audio and video services, such as closed captioning. "Ancillary data" can also refer to independent program services. The broadcast unit 102 may include a coder configured to minimize the number of bits needed to represent the audio and video information. If configured according to the ATSC standard, the broadcast unit 102 may employ the MPEG-2 video stream syntax for the coding of video and the Digital Audio Compression (AC-3) Standard for the coding of audio.

The broadcast unit 102 may also subject the digital broadcast data stream 103 to service and multiplex transport operations. As used herein, "service multiplex and transport" refers to the means of dividing the digital data stream into "packets" of information, the means of uniquely identifying each packet or packet type, and the appropriate methods of multiplexing video data stream packets, audio data stream packets, and ancillary data stream packets into a single data stream. By way of example, and not by way of limitation, digital broadcast unit 102 may employ the MPEG-2 transport stream syntax for the packetization and multiplexing of video, audio, and data signals for digital broadcasting systems. Such packetization and multiplexing is described e.g., ISO/IEC 13818-1:2000 (E), International Standard, Information technology—Generic coding of moving pictures and associated audio information: systems", which is incorporated herein by reference.

The digital broadcast data stream 103 may be converted to a digital broadcast signal 105 through processes referred to as channel coding and modulation. The channel coder takes the data bit stream encoded in the digital broadcast data stream 103 and adds additional information that can be used by a receiving device 110 to reconstruct the data from the received signal which, due to transmission impairments, may not accurately represent the transmitted signal. A modulation subsystem (or physical layer) uses the digital data stream information to modulate the transmitted signal. By way of example and not by way of limitation, the ATSC standard, the modulation subsystem offers two modes. Both modes are based on vestigial sideband modulation. One mode is a terrestrial broadcast mode known as 8-VSB. The other mode is a high data rate mode known as 16-VSB.

A digital broadcast receiving device 110 receives the digital broadcast signal 105 and extracts the digital broadcast data stream 103 encoded within the digital broadcast signal 105. By way of example, and not by way of limitation, the digital broadcast receiving device 110 may include a digital receiver 111, a processor 114, a memory 115, a display 117 and a data storage device 118. The digital broadcast receiving device 110 may be any type of device capable of receiving and utilizing the digital broadcast signal 105. By way of example, the digital broadcast receiving device 110 may be a digital television set, digital radio receiver, personal computer, laptop computer, a mobile or handheld device such as a cellular telephone, mobile internet device or mobile digital television receiver.

Furthermore, the term digital broadcast receiving device encompasses "digital media receivers", GPS devices, game consoles, portable game devices, home, mobile or device security systems, and any combination thereof and including other devices for which the present invention may be coupled to provide command and control.

The digital receiver 111 may include one or more tuners 112 and a decoder 113. The tuner(s) 112 may be coupled to an antenna 119 that receives the digital broadcast signal 105. The tuner 112 selects one or more particular frequencies from among the various signals that are picked up by the antenna 119. The tuner 112 and decoder 113 may extract data and generate audio and video signals from the digital broadcast signal 105. By way of example the tuner 112 and decoder 113 may provide the following functions: demodulation, transport stream demultiplexing, decompression, error correction, analog-to-digital conversion, AV synchronization and media reformatting to fit the specific type of display 117 optimally.

As used herein, demodulation refers to the process of transforming the received digital broadcast signal 105 into a usable signal from which data may be extracted and/or from which quality images and sound may be produced.

Transport Stream Demultiplexing may be implemented, e.g., where multiple digital signals are combined and then transmitted from one antenna source to create over the air broadcasts. In such a case, the decoder 113 may decode the digital broadcast data stream 103 and convert it to a suitable form for display of a particular program of the audio and/or video components with the display 117 or for extraction of a broadcast service data stream 108 from the digital broadcast data stream 103. The decoder 113 may implement decompression if the digital broadcast data stream 103 contains data in compressed form. The tuner 113 may decompress such data, e.g., by unpacking compressed packets of digital data to their original size.

The decoder 113 may also implement Error Correction to make sure that any data that is missing from the received digital broadcast signal 105 can be corrected. For instance, sometimes interference or a poor-quality signal will cause the loss of data information that the tuner 112 receives. In such cases, the decoder 112 may perform a number of checks and repair data so that a signal can be viewed on a TV set or data may be utilized by the processor 114.

The decoder 113 may implement AV Synchronization to coordinate audio and video signals being displayed on the display 117 in proper time. AV synchronization ensures that the audio does not lag behind the video that is being displayed on the display 117 or vice versa, so that both audio and video are in sync. Media reformatting allows the display 117 to properly display video images using the data extracted from the digital broadcast signal. Media reformatting is important since the formatting of images on TV sets may differ significantly according to the technology employed. For example, some televisions utilize an interlaced picture, whereas others utilize a progressive-scan picture.

The display 117 may be any suitable video and/or audio display usable with the digital broadcast signal 105. By way of example, and not by way of limitation, the display 117 may include a video monitor, such as a cathode ray tube (CRT), plasma display, liquid crystal display (LCD) or organic light-emitting diode (OLED) display. In addition, the display 117 may include one or more devices for generating audio, e.g., one or more speakers.

The receiving device 110 may also implement a backchannel 120 that allows information to be sent from the device to a broadcast unit 102 or a data center affiliated with the broadcast unit. The back channel 120 may be implemented through a digital broadcast signal transmitted from the device 110, e.g., via the antenna 119. Alternatively, the backchannel 120 may be implemented through some other mode of communication such as wireless telephony (e.g., cellular), wireless internet, cable, optical fiber and the like.

The receiving device 110 may also include a data storage device 118 for non-volatile storage of data. Examples of data storage devices include hard disk drives, flash memories, compact disk (CD) drives, digital video disk (DVD) drives, tape drives, and the like.

The processor 114 may execute software program instructions that facilitate the above-referenced functions. In addition, the processor 114 may execute program instructions $SW_1 \ldots SW_P$ for various digital broadcast data services. Data for these data services may be updated as part of the digital broadcast data stream 103 that is carried by the digital broadcast signal 105. The program instructions $SW_1 \ldots SW_p$ may operate on corresponding data $D_1 \ldots D_p$ for these broadcast data services that is stored, e.g., in the memory 115. According to an embodiment of the present invention, the digital broadcast receiving device 110 may update the data $D_1 \ldots D_p$ for digital broadcast data services that are broadcast over different channels according to a schedule. Any combination of subscriptions or services may be updated according to the schedule.

Specifically, the processor 114 may execute instructions that implement a scheduler SCH that implements a method for updating data broadcast over different channels. A first digital broadcast signal 105 may be received over a first digital broadcast channel. The receiving device 110 may be tuned to a second broadcast channel at a predetermined time and a second digital broadcast signal 106 may be received over the second digital broadcast channel. The second broadcast signal 106 includes data 108 associated with one or more services resident on the receiving device 110. Selected data associated with one or more of the data services may be extracted from the second digital broadcast signal 106 and the data may be stored in or used by the receiving device 110. By way of example, the extracted data may be stored in the memory 115 or storage device 118 for later use by one or more of the software programs $SW_1 \ldots SW_p$. The extracted data may replace portions of the data $D_1 \ldots D_p$ for the broadcast data services. Alternatively, the extracted data may be utilized by the receiving device without storing it. For example, extracted data may be utilized by one or more of the data service programs $SW_1 \ldots SW_p$ and then discarded.

It is noted that for the sake of example, the two digital broadcast signals 105, 106 are shown as being transmitted from different towers 104. This is not to be construed as a limitation upon any embodiment of the invention. Alternatively, the two digital broadcast signals may originate from the same broadcast tower 104.

In some embodiments, the scheduler SCH may be turned off in order to save power for the receiving device 110. This may be useful, e.g., if the device 110 relies on battery power, as in a mobile device. In other embodiments, the data extracted from the digital broadcast signal 105 may be stored in a buffer in the memory 115, while the receiver 111 tunes one of the tuners 112 to other channels to receive data updates until a certain amount of the buffer has been emptied. At that point the receiver 111 may tune back to the first channel to receive a fresh stream.

Information may be filtered from a geographic perspective based on device position information. To facilitate such functionality, the receiving device 110 may optionally include a position location system 116, such as a GPS receiver. For example, in the case of a mobile or hand-held device, GPS data may be used to filter weather and traffic updates and only download those that are relevant to the area in which the device is presently located. In some embodiments, the function of the position location system 116 may be implemented by one of the tuners 112 in conjunction with software running on the processor 114. The position location signal may originate from one or more of the towers 104.

Figure 2:
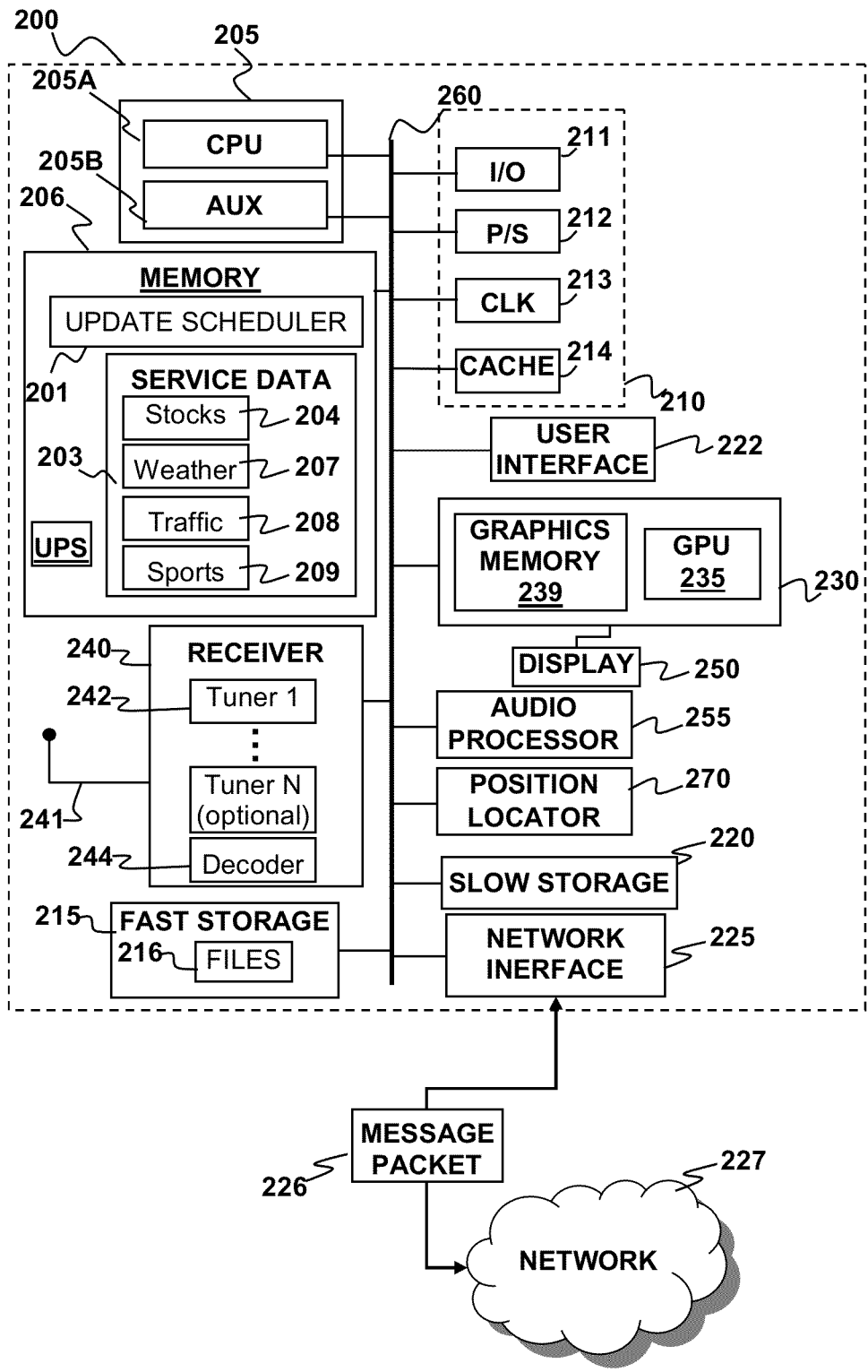
FIG. 2 is a block diagram of an apparatus that implements scheduled updating of digital broadcast data according to an embodiment of the present invention.

By way of example, a digital broadcast receiving device 200 shown in FIG. 2 may be configured to implement scheduled updating according to an embodiment of the present invention as shown in FIG. 1. By way of example, and without loss of generality, the receiving device 200 may be implemented as part of a digital television set, personal computer, video game console, personal digital assistant, mobile or handheld device such as a cellular phone or personal digital assistant, portable email device and the like, or other digital device. The device 200 may include a central processing unit (CPU) 205 and a memory 206 coupled to the CPU 205. The CPU 205 may be configured to run software applications and, optionally, an operating system. Some embodiments of the present invention may take advantage of certain types of processor architecture in which the CPU 205 includes a main processor 205A and one or more auxiliary processors 205B. Each auxiliary processor may have its own associated local data storage. One example, among others of such a processor architecture is a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The memory 206 may store applications and data for use by the CPU 205. The memory 206 may be in the form of an integrated circuit, e.g., RAM, DRAM, ROM, and the like). A computer program 201 may be stored in the memory 206 in the form of instructions that can be executed on the processor 205. The instructions of the program 201 may be configured to implement, amongst other things, an update scheduler having certain features described below.

The update scheduler program 201 may facilitate updating of data for digital broadcast data services that are resident on the device 200. By way of example, and not by way of limitation, the memory 206 may contain service data 203 and/or programs usable in conjunction with such services. Examples of such services include, but are not limited to stock quotes 204, weather 207, traffic 208 and sports 209. Examples of stock quote service data 204 include, but are not limited to, prices of stocks. Examples of weather service data 207 include, but are not limited to, the text of weather forecasts. Examples of traffic service data 208 include local traffic conditions, notices of road closures or hazards and the like. Examples of sports data 209 include, but are not limited to, scores, statistics and standings.

By way of example, the update scheduler program 201 may include instructions to update the service data 203 in memory 206 with data broadcast over different channels. A first broadcast stream may be received over a first digital broadcast channel. The receiving device 200 may be tuned to a second broadcast channel at a predetermined time and a second broadcast stream may be received over the second digital broadcast channel. Selected data associated with one or more of the services may be extracted from the second digital broadcast signal and the data may be stored or utilized with the receiving device.

The receiving device 200 may also include well-known support functions 210, such as input/output (I/O) elements 211, power supplies (P/S) 112, a clock (CLK) 213 and cache 214. The device 200 may further include a fast data storage device 215 such as a hard disk drive that provides non-volatile storage for applications and data. The fast storage device 215 may be used for temporary or long-term storage of files 216 retrieved from a slower data storage device 220. By way of example, the storage device 215 may be a fixed disk drive, removable disk drive, flash memory device, tape drive. The slower storage device 220 may be, e.g., a CD-ROM, DVD-ROM, Blu-ray, HD-DVD, UMD, or other optical storage devices. Files 216 from the slower storage device 220 may be temporarily stored in the storage device 215 in a hardware cache for quick loading into the memory 206.

The device 200 may include a digital broadcast receiver 240 which may be coupled to an antenna 241. One or more digital broadcast tuners 242 may receive digital broadcast signals picked up by the antenna 241. The receiver 240 may further include a decoder 244, which may implement the functions described above.

One or more user input devices 222 may be used to communicate user inputs from one or more users to the system 200. By way of example, one or more of the user input devices 222 may be coupled to the client device 200 via the I/O elements 211. Examples of suitable input device 222 include keyboards, mice, joysticks, touch pads, touch screens, light pens, still or video cameras, and/or microphones. The client device 200 may include a network interface 225 to facilitate communication via an electronic communications network 227. The network interface 225 may be configured to implement wired or wireless communication over local area networks and wide area networks such as the Internet. The system 200 may send and receive data and/or requests for files via one or more message packets 226 over the network 227.

The system 200 may further comprise a graphics subsystem 230, which may include a graphics processing unit (GPU) 235 and graphics memory 239. The graphics memory 239 may include a display memory (e.g., a frame buffer) used for storing pixel data for each pixel of an output image. The graphics memory 239 may be integrated in the same device as the GPU 235, connected as a separate device with GPU 235, and/or implemented within the memory 206. Pixel data may be provided to the graphics memory 239 directly from the CPU 205. Alternatively, the graphics unit may receive video signal data extracted from a digital broadcast signal from the decoder 244. Alternatively, the CPU 205 may provide the GPU 235 with data and/or instructions defining the desired output images, from which the GPU 235 may generate the pixel data of one or more output images. The data and/or instructions defining the desired output images may be stored in memory 206 and/or graphics memory 239. In an embodiment, the GPU 235 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 235 may further include one or more programmable execution units capable of executing shader programs.

The graphics subsystem 230 may periodically output pixel data for an image from the graphics memory 239 to be displayed on a video display device 250. The video display device 250 may be any device capable of displaying visual information in response to a signal from the device 200, including CRT, LCD, plasma, and OLED displays that can display text, numerals, graphical symbols or images. The digital broadcast receiving device 200 may provide the display device 250 with a display driving signal in analog or digital form, depending on the type of display device. In addition, the display 250 may include one or more audio speakers that produce audible or otherwise detectable sounds. To facilitate generation of such sounds, the client device 200 may further include an audio processor 255 adapted to generate analog or digital audio output from instructions and/or data provided by the CPU 205, memory 206, and/or storage devices 215, 220.

The receiving device 200 may optionally include a position location device 270. Such a device may be based on any suitable technology capable of providing information on the geographic location of a device. Examples of existing technology include global positioning satellite (GPS) technology, inertial guidance technology, and the like. Information from such devices may be used in digital broadcast data applications such as navigation for mobile or hand-held devices.

The components of the device 200, including the CPU 205, memory 206, support functions 210, data storage devices 215, 220 user input devices 222, network interface 225, graphics unit 230, audio processor 255 and position location device 270 may be operably connected to each other via one or more data buses 260. These components may be implemented in hardware, software or firmware or some combination of two or more of these.

Figure 3:
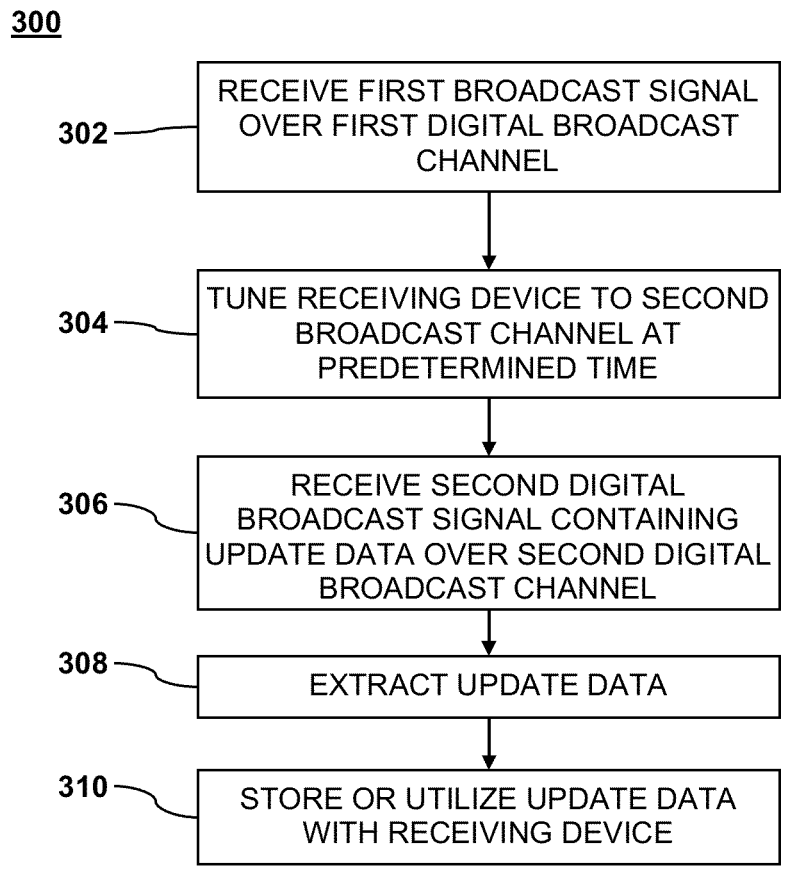
FIG. 3 is a flow diagram illustrating a method of scheduled updating of digital broadcast data according to an embodiment of the present invention.

By way of example, and not by way of limitation, the update scheduler program 201 may update the data for digital broadcast services that are broadcast over different channels in accordance with a method 300 depicted in the flow diagram of FIG. 3. As indicated at 302 a first broadcast stream is received over a first digital broadcast channel. The receiving device 200 is tuned to a second digital broadcast channel at a predetermined time as indicated at 304. The first broadcast stream may include digital television programming mixed with overlaid data. The overlaid data may be associated with the first digital broadcast channel or with another digital broadcast channel. There are a number of ways in which data may be overlaid with digital television programming. For example, data packets may be interleaved into a digital television broadcast stream. Such a scheme is sometimes referred to as time division multiplexing (TDM). In this scheme two or more signals or bit streams are transferred apparently simultaneously as sub-channels in one communication channel. In reality the two bit streams are physically taking turns on the channel. In TDM, the time domain may be divided into several recurrent timeslots of fixed length, one for each sub-channel. A sample, byte or data block of each sub-channel may be transmitted during its corresponding timeslot, e.g., sub-channel 1 during timeslot 1; sub-channel 2 during timeslot 2, etc.

A second broadcast stream is then received over the second digital broadcast channel, as indicated at 306. The second broadcast stream includes data associated with one or more services resident on the receiving device 200. Data associated with one or more of these services may be extracted from the second broadcast stream as indicated at 308. As used herein the term "extracted" in this context refers to the process of demodulating the signal carrying the second broadcast stream and decoding it into data that can be read and manipulated by the processor. Extracting the data from the broadcast stream may also include the process of separating data relevant to specific services from amongst the data decoded from the digital broadcast signal.

Once the relevant data has been extracted it may be stored in or utilizing by the receiving device 200 as indicated at 310. By way of example, the relevant data may be stored in the memory for later use by the service programs. Alternatively, the service programs may make immediate use of the relevant data and then either store or discard the data. In some embodiments of the present invention, updates for certain broadcast data services 203 may have different priorities. In such cases, the update scheduler 201 may be configured to select the channel for such updates based on an update priority schedule UPS for the broadcast data services 203. The update priority schedule UPS may be stored in the memory 206.

There are a number of different ways in which the receiving device may scheduled updates may be implemented. There are a number of different ways in which the scheduler 201 may determine the predetermined time for switching channels in order to receive updates. In some embodiments, the update scheduler 201 may determine a predetermined time for switching from one channel to another from data embedded in the digital broadcast signal to which the receiver 240 is currently tuned. By way of example, and not by way of limitation, data may be embedded in the broadcast signal indicating the time of a relevant data gap in a stream of programming packets in the digital broadcast signal. The scheduler 201 may utilize such data to select the predetermined time for changing channels to coincide with the data gap.

Figure 4A:
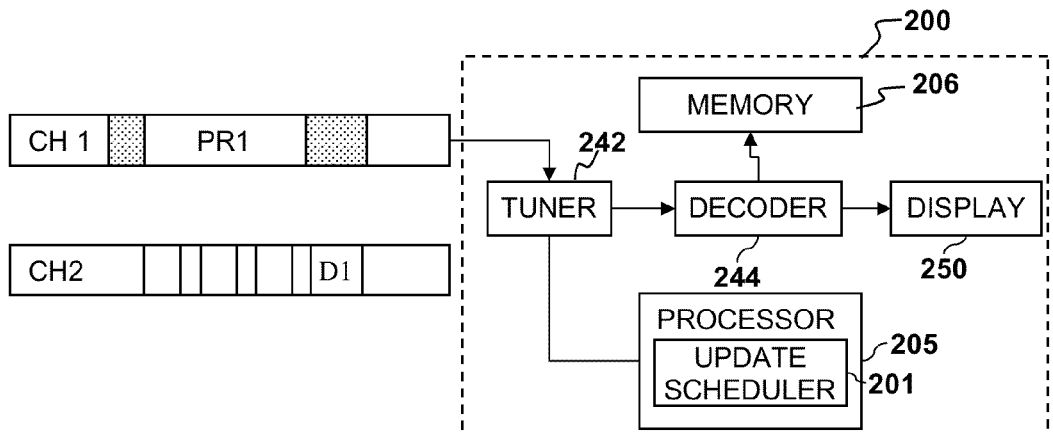
FIGS. 4A-4B schematically illustrate an example of scheduled updating of digital broadcast data with a single tuner according to an embodiment of the present invention.
Figure 4B:
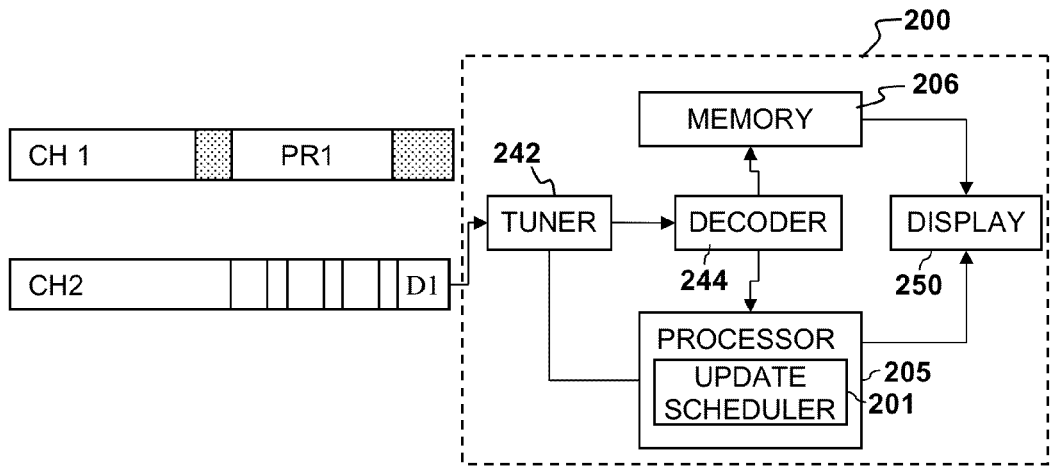

For example, as shown in FIGS. 4A-4B, a single tuner 242 may update data received over multiple channels where data and digital television programming a time division multiplexed. As shown in FIG. 4A, first and second digital data streams are transmitted over first and second channels CH1 and CH2. The data stream on the first channel CH1 contains digital television programming data PR1 that is time division multiplexed in the data stream with other data. The other data may be in the form of programming for a different sub-channel or data for a digital broadcast data service. The data stream on the second channel CH2 includes data for a digital broadcast data service D1 that is time division multiplexed with other data. The other data on the second channel CH2 may be data for other digital broadcast services or digital television programming for one or more sub-channels of the second channel CH2.

Initially, the single tuner 242 is tuned to the first channel CH1, as shown in FIG. 4A. After the decoder 244 decodes the program data PR1 from the first channel's data stream the decoded data may be used directly for display on the display device 250 or may be stored in the memory 206, e.g., in a buffer for later display.

If the data stream on the first channel CH1 is time divisional multiplexed there may be gaps in the data stream during which the device 200 may receive no relevant broadcast program or other data. For example, suppose the user of the device 200 is watching a certain program on a certain sub-channel of the first channel CH1. If the time division multiplexing is done on a schedule, there may be intervals of time during which data other programming is transmitted over other sub-channels of the first channel CH1. The decoder 244 may ignore this data if the device 200 is not configured to receive them. During such intervals, the update scheduler 201 may direct the tuner 242 to switch to the second channel CH2 to receive updates for digital broadcast data service D1 as shown in FIG. 4B. The data may be decoded from the data stream by the decoder 244 and displayed on the display 250 or stored in a data buffer for later use or display. The update scheduler may then direct the tuner 242 to switch back to the first channel CH1 to receive programming data PR1 during the next time slot for such data.

Gaps in buffered programming data PR1 or digital service data D1 stored in the memory 206 may be filled, e.g., through forward error correction. Forward error correction (FEC) refers to a system of error control for data transmission, whereby the sender adds redundant data to its messages, also known as an error correction code. This allows the receiver to detect and correct errors (within some bound) without the need to ask the sender for additional data. The advantage of forward error correction is that a back-channel is not required, or that retransmission of data can often be avoided, at the cost of higher bandwidth requirements on average.

As an alternative to FEC, the update scheduler 201 may be configured to identify one or more missing data packets from the second broadcast stream that were not received as part of an update. Such packets may be identified, e.g., if each packet contains a sequential identifier and the scheduler 201 determines from these identifiers that one or more packets were not received. The scheduler 201 may then invoke a routine for retrieving the one or more missing data packets, e.g., by downloading them through a back channel, such as the network 227.

Figure 4C:
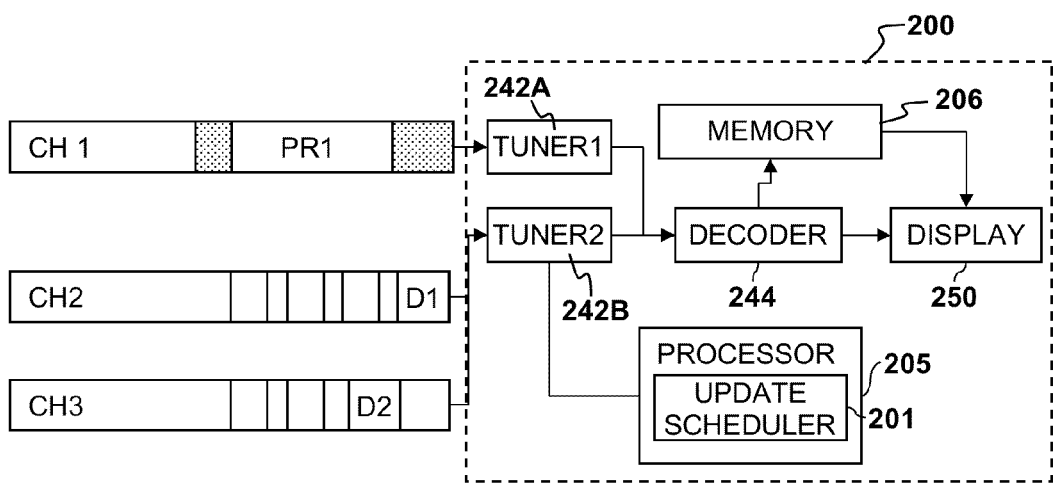
FIG. 4C schematically illustrates an example of scheduled updating of digital broadcast data with a multiple tuners according to an embodiment of the present invention.

Embodiments of the present invention may also be implemented on receiver devices having a two or more tuners. For example, as shown in FIG. 4C, the receiving device 200 may include a first tuner 242A and a second tuner 242B. In such a case, the first tuner 242A may be tuned to the first digital broadcast channel CH1 and the second tuner 242B may be selectively tuned to another digital broadcast channel (e.g., CH2 or CH3) at the predetermined time. A digital broadcast signal from the other channel may be received with the second tuner 242B and the digital broadcast signal from the first channel CH1 may be received with the first tuner 242A.

According to certain embodiments, it may be useful to determine a geographic location of the receiving device. Certain digital broadcast services, such as weather and traffic information are local in nature. By way of example and not by way of limitation, a user of a digital receiving device located in, say, a particular locale within the Los Angeles metropolitan area would likely be interested in traffic information for that locale. If such a user is traveling to a destination in a different locale, the user might also be interested in traffic conditions in the vicinity of the destination and along the route to the destination. The digital broadcast signal may include traffic information for several different locales within the Los Angles area. In such a case it may be useful to filter out the traffic information most relevant to the user of the receiving device. To facilitate such filtering, the position locating device 270 may provide geographic location information that may be used to filter location-specific relevant information from the digital broadcast signal. Furthermore, in accordance with certain embodiments of the present invention, the scheduler 201 may select the digital broadcast channel to which to tune for particular data updates (e.g., traffic or weather data updates) based on the geographic location of the receiving device as determined by the position locating device 270.

By way of example, and not by way of limitation, the digital broadcast signal may include traffic data update packets that include in their headers information identifying a region for which the information is relevant. The update scheduler 201 may extract the information from these headers and use such information to determine whether to store, use or discard the information in the packet. For example, a packet header for a packet containing traffic information may identify the information as being relevant to Northridge. Information obtained by the position locating device 270 may indicate that the device is located in Northridge, heading to Northridge or traveling on a route through Northridge. Based on this information, the scheduler 201 may choose to store or utilize the information. Similarly, if the packet header indicates that the information is for some irrelevant region, e.g., one where the device is not located, going to, or scheduled to travel through, the scheduler 201 may be configured to ignore the packet.

Figure 5:
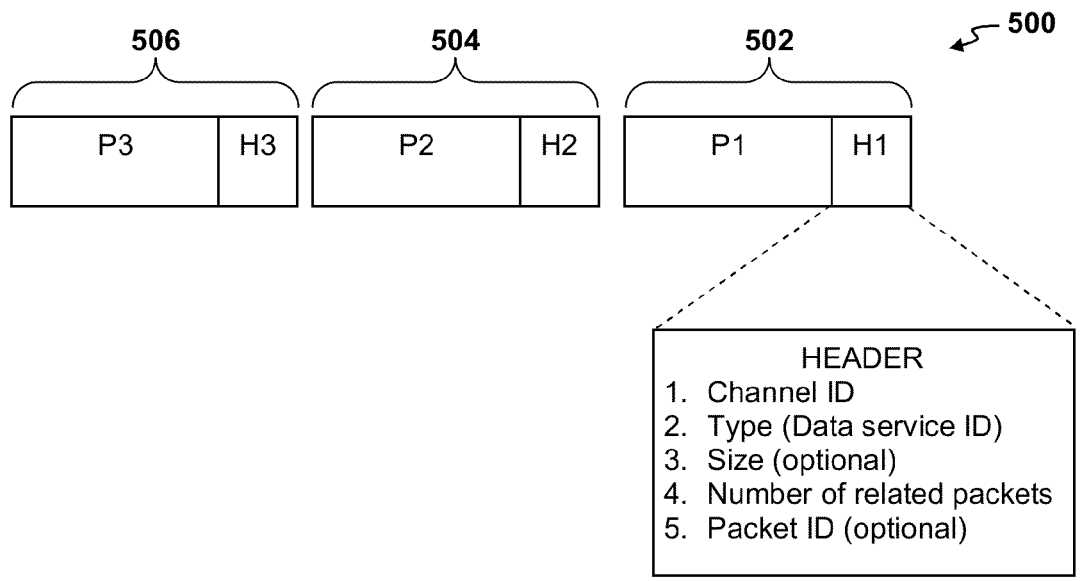
FIG. 5 is block diagram of an input data stream that may be used in conjunction with scheduled updating of digital broadcast data according to an embodiment of the present invention.

In some embodiments, the update scheduler 201 may determine a switching scheme or schedule for updating data from different channels using schedule data received as part of a digital broadcast signal. By way of example, and not by way of limitation, FIG. 5 depicts a data stream 500 that may be used in conjunction with scheduled updating of digital broadcast data according to an embodiment of the present invention. The data stream 500 (e.g., an input data stream 101 or digital broadcast data stream 103) may include a plurality of data packets 502, 504, 506. Each packet may include a header H1, H2, H3 and a payload P1, P2, P3. The headers H1, H2, H3 for the packets 502, 504, 506 may include information regarding the data in the corresponding payloads P1, P2, P3. Such information may include, but is not limited to, a channel identifier, a data type, an optional packet, information identifying a number of related packets, and a packet identifier.

The packet headers H1, H2, H3 may also indicate one or more of the following: a frequency of a broadcast burst, a total number of groups of bursts that make up a complete update for a service, a time start signal in which a broadcast or service or burst or complete update for a service will occur, a channel, or frequency of the transmission, a sub-channel associated with the packet, a URL associated with the broadcast, service or transmission, and any combination thereof and including that which may be coupled to an application or operating system and prompting the application or operating system to take an action in response thereto.

The channel identifier may identify the particular channel (or channels) over which the packet is to be broadcast. The sub-channel identifier may identify the particular sub-channel within a channel for a service with which the packet is associated. The data type may identify the particular data service or data type for the data in the payload. The packet size may specify a size of the data contained in the payload. The packet identifier and information identifying a number of related packets may be used to facilitate reconstruction of a block data sent over the course of multiple packets. For example, the packet identifier may uniquely identify a packet as being part of a particular group of packets and the information identifying a number of related packets may indicate that this particular packet is the fifth packet in the group. In some versions, information identifying related packets may include information identifying a number of related downstream packets (i.e., packets to be broadcast later).

Figure 6:
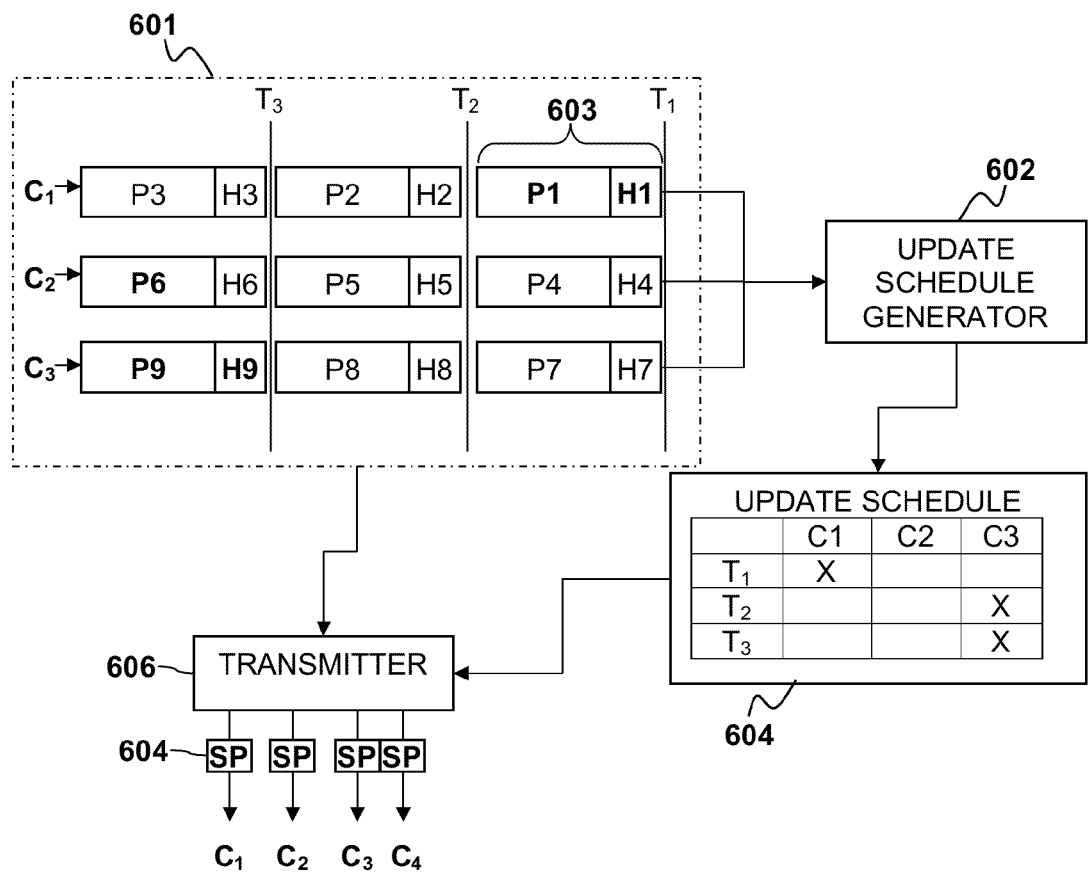
FIG. 6 is a flow diagram illustrating an example of generating an update schedule from multiple input data streams according to an embodiment of the present invention.

FIG. 6 illustrates an example of how an update schedule may be generated from multiple input data streams. As seen in FIG. 6, an input data stream 601 for a digital broadcast signal may contain input streams for multiple digital broadcast channels C1, C2, C3. In this example, each channel C1, C2, C3 is broadcast over a different carrier frequency. The digital broadcast signals for the channels C1, C2, C3 may be broadcast more or less simultaneously by a transmitter 606 using frequency division multiplexing. Individual data streams for different programming and digital data services within the within each channel may be multiplexed using time division multiplexing. The data streams for each channel are made up of packets 603, having a payload P1 ... P9 and corresponding headers H1 ... H9. As discussed above, each header may identify the type of data in the packet. In particular the headers may identify whether a packet is associated with television programming or a data service. If a packet is associated with a data service, the header for that packet may identify the specific data service. The headers of all the packets in the input data stream 601 may be analyzed by an update schedule generator 602 to determine which packets contain updates for data services. Furthermore, the update schedule generator 602 may determine a time of broadcast for each of the packets 603. For example, the update schedule generator may receive the packets in the order in which they are to be broadcast. From this broadcast order, the update schedule generator may determine the time at which a given packet is to be broadcast. In the example depicted in FIG. 6, the packets having payloads P1, P4, and P7 are to be broadcast at time T1, the packets having payloads P2, P5, and P8 are to be broadcast at time T2, and the packets having payloads P3, P6, and P9 are to be broadcast at time T3.

The update schedule generator 602 may combine the information from the packet headers and the transmission times to generate an update one or more schedule packets 604. These packets may contain information indicating the time of broadcast of update packets. By way of example, suppose that the packet payloads P1, P6 and P9 in the input data stream 601 contain update for digital broadcast data services. The update schedule generator 602 may determine this from information in the headers H1, H6, and H9. From the order of the packets in the in data stream 601 the update schedule generator 602 may determine that the packet containing payload P1 is to be broadcast over channel C1 at time T1 and the packets containing payloads P6 and P9 are to be broadcast over channels C2 and C3 respectively at time T3. The update schedule generator 602 may combine this information into the update schedule packet 604 along other information included in the packet headers, as described above. For the sake of example, the update schedule is shown in the form of a table. An "X" in the table indicates that an update is scheduled to be broadcast over a particular channel at a particular time. Blank spaces in the table indicate that no update is scheduled for a given channel at a given time. Spaces in the table marked with an "X" may include additional information relating to the update, e.g., obtained from the header of the corresponding update packet. This particular configuration is not meant as a limitation upon the invention. The update schedule packets 604 may be inserted into the digital broadcast signals for channels C1, C2 and C3 and transmitted by the transmitter 606 before the corresponding update packets containing payloads P1, P6 and P9 are broadcast. In this way a receiving device may receive an update schedule packet independent of whether it is tuned to any particular one of the channels C1, C2 or C3. A given update schedule packet 604 may be broadcast multiple times over a given channel to increase the chance that a receiving device will receive it in time to implement channel switching to receive a relevant update packet.

In some situations, it may be desirable to repeatedly broadcast the update schedule packets 604 at a regular duty cycle to increase the likelihood that they will be received in a timely manner. In addition, the number of data packets broadcast between update schedule packets and the times at which the update schedule packets are broadcast may also vary. As seen in FIG. 6, the update schedule packets may include information identifying the duty cycle with which update schedule packets are broadcast. For example, update schedule packets SP may be broadcast along with data packets P1 . . . P11. Initially, the update schedule packets SP may be broadcast at a duty cycle $d_1$ of one update schedule packet followed by three data packets. The update schedule packets SP may identify that a subsequent schedule packets will be broadcast at a new duty cycle $d_2$ of one update schedule packet followed by two data packets. The update scheduler 201 may take such update schedule packet duty cycle changes into account when determining when to hop between channels.

Figure 7:
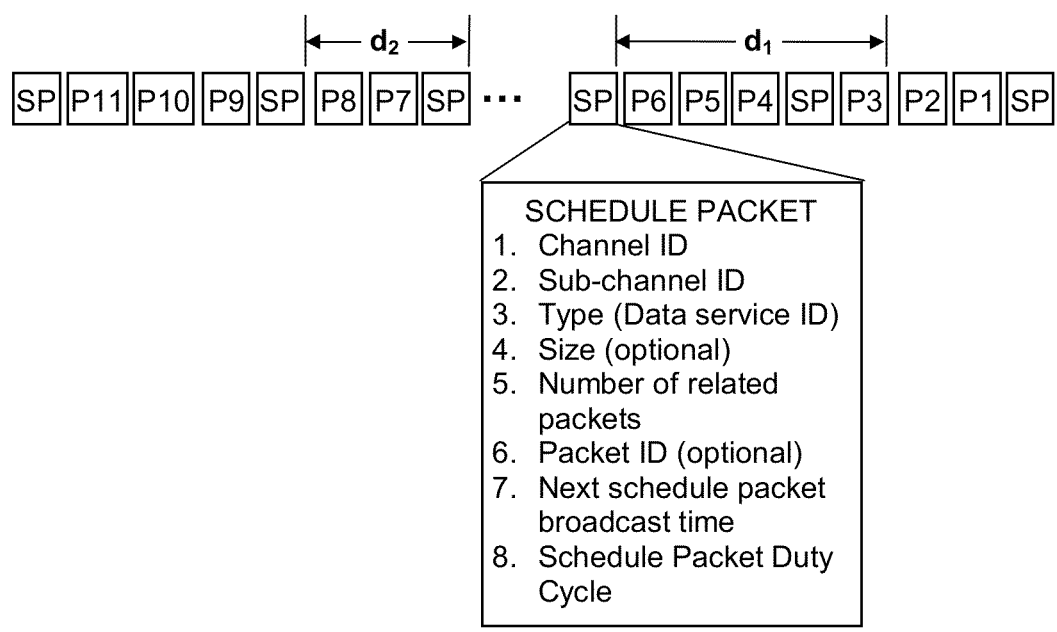
FIG. 7 illustrates a flow diagram illustrating an example of transmitting schedule packets at varying duty cycles according to an embodiment of the present invention.

In some embodiments, the update schedule packet scheme described above may be utilized to synchronize services on different sub-channels within a given digital broadcast channel transmitted over a given frequency. For example, as depicted in FIG. 7, update schedule packets SP may include information relating to different sub-channels with a digital broadcast stream may be time multiplexed. Services on different sub-channels may be used by different applications within the receiving device 200. The update schedule program 201 may make use of sub-channel update information from the update schedule packets to efficiently allocate computational resources within the device 200.

Embodiments of the present invention allow for efficient updating of data services received in conjunction with a digital broadcast signal. Data services may be updated while a device is presenting digital television programming so that a user has timely access to relevant data.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A method for generating an update schedule for data transmitted with a signal, comprising:
   a) receiving one or more input data streams containing data for one or more data services, wherein the data is in the form of a plurality of packets, wherein each packet includes information identifying a channel and a number of related downstream packets;
   b) determining from the plurality of packets a time that an update packet containing data for one of the data services will be transmitted as part of a signal;
   c) generating a schedule packet containing the time that the update packet will be transmitted as part of the signal; and
   d) transmitting the schedule packet as part of the signal.

2. The method of claim 1, wherein transmitting the schedule packet as part of the signal includes transmitting the schedule packet before transmitting the update packet as part of the signal.

3. The method of claim 1, wherein the information identifying a broadcast channel and a number of related downstream packets includes information identifying a channel over which a packet is to be transmitted.

4. The method of claim 1, wherein the information identifying a channel and a number of related downstream packets includes information identifying a type of data in the packet.

5. The method of claim 1 wherein the information identifying a broadcast channel and a number of related downstream packets includes information identifying a size of the packet.

6. The method of claim 1 wherein the information identifying a broadcast channel and a number of related downstream packets includes information identifying a given packet as being associated with other packets in the signal.

7. The method of claim 1 wherein the schedule packet includes update times for update packets that are to be transmitted over different channels.

8. The method of claim 1 wherein the schedule packet includes information relating to a broadcast time for one or more other schedule packets.

9. The method of claim 1 wherein the schedule packet includes information relating to a broadcast time for one or more other schedule packets.

10. The method of claim 1 wherein the schedule packet includes information relating to a duty cycle with which schedule packets are transmitted.

11. An apparatus for generating an update schedule for data transmitted with a signal, comprising:
- a processor;
- a memory;
- a set of processor-executable instructions embodied in the memory, the instructions being configured to implement a method, the method comprising:
  - a) receiving one or more input data streams containing data for one or more data services, wherein the data is in the form of a plurality of packets, wherein each packet includes information identifying a channel and a number of related downstream packets;
  - b) determining from the plurality of packets a time that an update packet containing data for one of the data services will be broadcast as part of a signal;
  - c) generating a schedule packet containing the time that the update packet will be transmitted as part of the signal; and
  - d) transmitting the schedule packet as part of the signal.

12. The apparatus of claim 11, further comprising a transmitter configured to transmit the schedule packet.

13. A non-transitory computer-readable medium having instructions embodied therein for implementing a method for generating an update schedule for data transmitted with a signal, wherein the method comprises:
- a) receiving one or more input data streams containing data for one or more data services, wherein the data is in the form of a plurality of packets, wherein each packet includes information identifying a channel and a number of related downstream packets;
- b) determining from the plurality of packets a time that an update packet containing data for one of the data services will be transmitted as part of the signal;
- c) generating a schedule packet containing the time that the update packet will be transmitted as part of the signal; and
- d) transmitting the schedule packet as part of the signal.

14. The transitory computer-readable medium of claim 13, wherein
transmitting the schedule packet as part of the signal includes transmitting the schedule packet before transmitting the update packet.

* * * * *